United States Patent [19]

Jörg

[11] 3,919,944
[45] Nov. 18, 1975

[54] WINGED SURFACE EFFECT VEHICLE

[75] Inventor: Günter W. Jörg, Grossbieberau, Germany

[73] Assignee: Vereinigte Flugtechnische Werke-Fokker GmbH, Bremen, Germany

[22] Filed: May 22, 1974

[21] Appl. No.: 472,187

[30] Foreign Application Priority Data
May 26, 1973   Germany............................ 2327024

[52] U.S. Cl. ............ 104/23 R; 104/23 FS; 180/116
[51] Int. Cl.² ......................................... B61B 13/08
[58] Field of Search ...................... 104/23 R, 23 FS

[56]   References Cited
UNITED STATES PATENTS
1,798,852   3/1931   Roghmanns..................... 104/23 R
3,603,261   9/1971   Mann ............................ 104/23 FS

*Primary Examiner*—M. Henson Wood, Jr.
*Assistant Examiner*—D. W. Keen
*Attorney, Agent, or Firm*—Ralf H. Siegemund

[57]   ABSTRACT

The vehicle is connected to a carriage by means of a frame pivoted to the carriage and holding the vehicle at a particular altitude as it rides on an air-cushion developed dynamically under the wing of the vehicle, while the carriage runs and is retained on a monorail.

6 Claims, 3 Drawing Figures

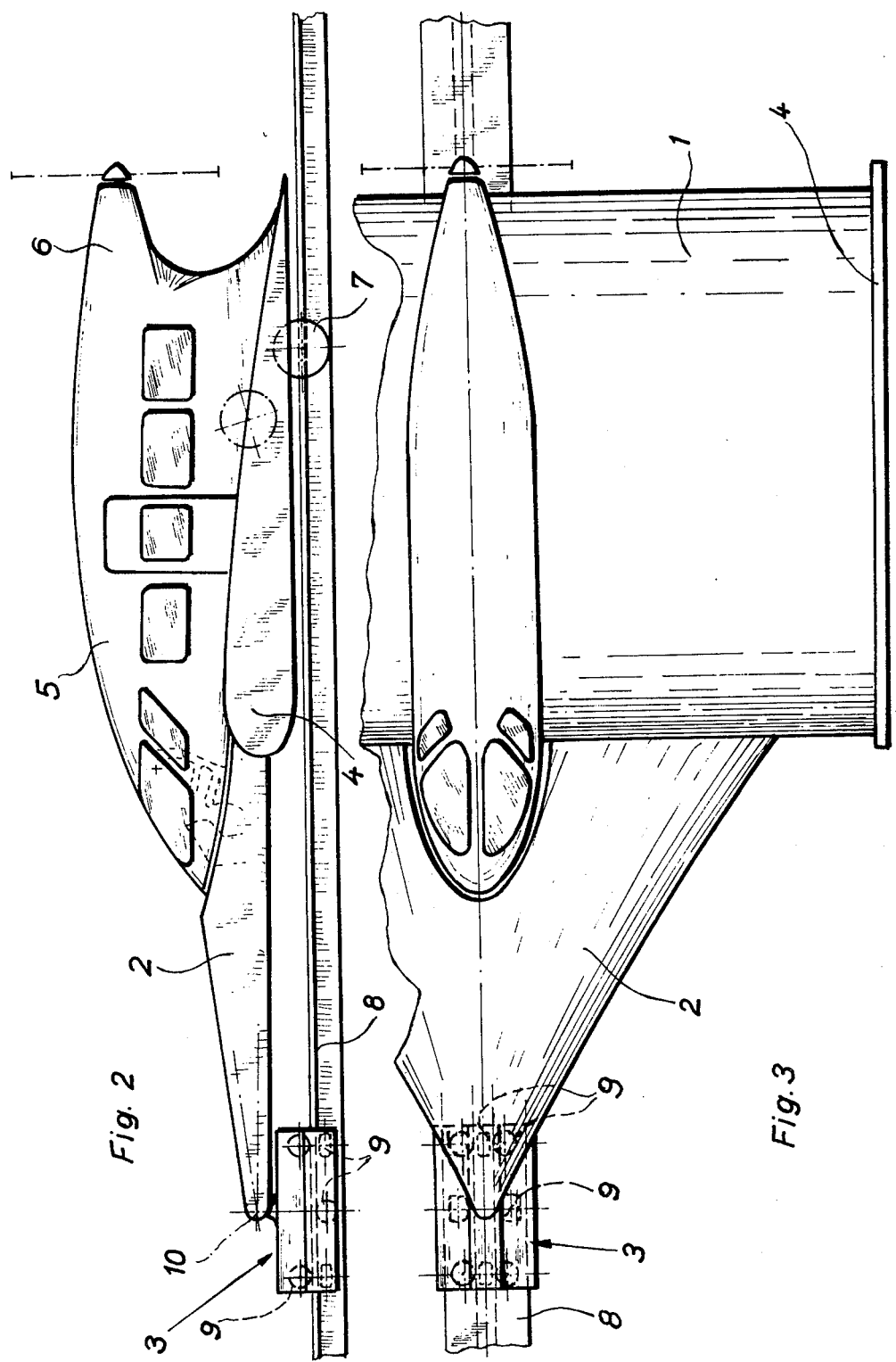

WINGED SURFACE EFFECT VEHICLE

BACKGROUND OF THE INVENTION

The present invention relates to improvement in winged surface effect aircraft.

The known aircraft of this variety are equipped with control elements operating for maintaining the aircraft at a definite height, so that the surface effect can be benefitted from to the fullest. The operator of such a vehicle must, therefore, know how to fly such a type of craft. Even then, it was found quite difficult to maneuver the craft always into the respective range of maximum effectiveness of the surface effect.

DESCRIPTION OF THE INVENTION

It is an object of the present invention to overcome this problem and to provide for a single wing aircraft, operating on the basis of the surface effect and permitting automatic stabilization and control.

In accordance with the preferred embodiment of the invention, it is suggested to hold the winged surface effect vehicle on a rail track by means of a guide element, such as a carriage rolling on the track and held thereon against lateral and vertical displacement. The connection between carriage and vehicle should be made at a longitudinally displaced point relative to the craft itself, either in the rear but preferably in the front. The connection of the vehicle to the carriage is preferably a pivotal one and established by means of a frame extending from the front of the vehicle, and having its front pivoted to the carriage. The frame may be adjustible relative to the craft.

As a consequence, a vehicle so provided rides on a cushion developed aerodynamically but is stabilized without aerodynamic control. The pivotal connection of the craft at a point longitudinally displaced from the center of lift production permits the craft to rise for a certain distance and fly. Any attitude change by a pitch moment developed on the transverse or pitch axis of the craft is counteracted by a reaction moment about a horizontal axis through the pivot connection and running parallel to but being displaced from the transverse axis of the craft itself, so that the attitude of the craft is stabilized by causing disturbance moments to be reacted into the rail track.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which in which:

FIG. 2 is a side elevation of the same craft; and

FIG. 3 is a top view shown in alignment with FIG. 2 to facilitate comparison.

Figure 1:
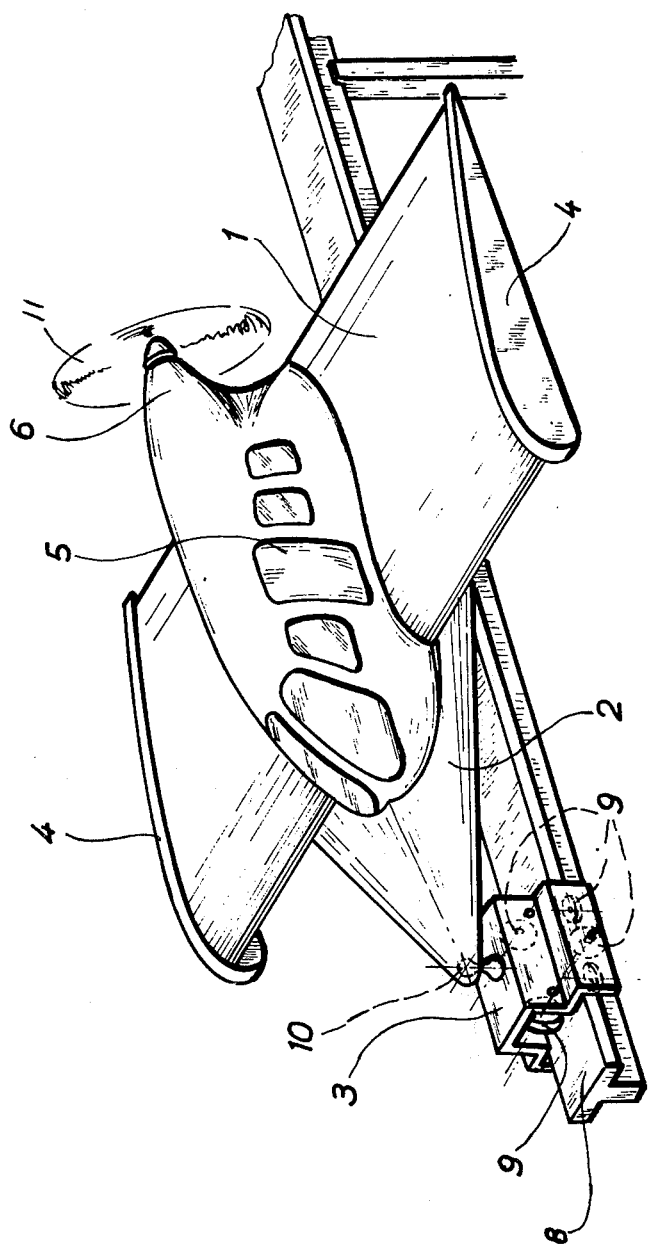
FIG. 1 is a perspective view of a winged surface effect vehicle constructed and improved in accordance with the preferred embodiment of the invention.

Proceeding now to the detailed description of the drawings, the figures illustrate an aircraft having a wing 1 extending from both sides of a fuselage or cabin 5. A frame 2 is connected to cabin 5 and wing 1 and extends from the front of the vehicle, but along the longitudinal axis thereof. The front end of frame 2 is fastened to a guide element 3 which runs on a rail track 8 while holding the vehicle.

The wing 1 has a small but definite positive angle of attack, and streamlined end disks 4 are provided on both ends of the wing. The propelling unit 6 is provided in cabin 5 and drives a single propeller 11.

As schematically indicated in FIG. 2, a retractible undercarriage 7 is provided in and under the wing permitting, for example, the craft to run on a widened track portion on takeoff and landing, but retraction reduces drag and avoids unnecessary disturbance of the aircushion, on which the vehicle rides when propelled forward.

The frame 2 has broad, beak-like configuration, or more accurately, the frame is clad in a manner to obtain the illustrated contour. The frame is adjustibly secured to the vehicle, so that the relative orientation of the vehicle is adjustible therewith. This is of advantage as the craft can be expected to carry different loads at different times. Such adjustment changes the relative disposition of the craft and its attitude relative to the point of fastening to the guide element 3. If the frame 2 permits also length adjustment, the lever arm length of the frame plus vehicle in relation to the pivot can be adjusted therewith. Either adjustment is not changed during operation.

Turning now to particulars of guide element 3, it is constructed as a carriage with rollers or wheels 9 journalled in carriage 3 in that some wheels run on vertical axes, others on horizontal axes. This way carriage 3 does not just run on rail 8, but the wheels with vertical axes engage the rail sideways, and from opposite sides, thereby holding the carriage in lateral alignment with the course of the rail track. The rail track 8 is of a simple monorail variety and has T bar configuration whereby the laterally acting wheels 9 of carriage 3 engage the stem of the T. Some of the wheels with horizontal axes run on the top surface of the T while others run along the two downwardly oriented surface.

It can thus be seen that the carriage 3 held on the rail track against lateral as well as against vertical displacement.

The carriage 3 is connected to frame 2 by means of a ball and socket joint 10, to permit change of orientation of the craft as a whole when held on carriage 3. Particularly, the vehicle plus frame structure can pivot on a horizontal axis through joint 10, to follow the variations of aerodynamic pressure of the lift-producing cushion underneath when the vehicle is propelled forward. The pivot joint permits also lateral angular deflection about a vertical axis through joint 10.

Except for the adjustibility, frame 2 is secured to wing 1 during operation, so that frame plus wing act as a rigid unit with respect to the ball and socket connection to carriage 3 and pivot relative thereto as a whole. Hence, when frame plus vehicle pivot the angle of attack changes for a change of the aerodynamic left conditions of the vehicle.

In operation, propeller 11 produces forward thrust, and an air-cushion is developed under the wing solely by dynamic flow along the wing on forward motion and will produce lift accordingly. Upon further acceleration, the wing lifts and flies along the rail, thereby riding on the air-cushion dynamically developed underneath. The craft is held in position by the carriage 3 as connected to frame 2, because the combination of fastening in front and aerodynamic lift underneath determines attitude and distance of the craft from ground.

It can readily be seen that the length of the frame is one factor for determining the attitude of the craft in relation to distance from ground, while the height of the rail track above ground is another factor. Together, the operation of the craft can be optimized for a particular speed and load. The frame can be adjusted on wing 1 as additional attitude correction. In any event, the craft will fly behind the carriage in a particular attitude and altitude, and deviation therefrom is corrected by stabilization operating as follows:

The craft as a whole can pivot including pivoting on a horizontal axis that runs through joint 10, well in front of the aircraft. On the other hand, the craft tends to change attitude by turning on its transverse pitch axis for reasons of temporaty disturbance. If such a tendency to change attitude (pitch) of the vehicle occurs, the attitude disturbing moment is actually reacted into the carriage 3 and the rail. Therefore, a corrective moment is set up by virtue of the pivotal connection of the craft to carriage 3, well in front of the pitch axis, and stabilizing the attitude of the craft. The possibility of disturbance as well as counteracting correcting moment occurs in either direction. This way the craft is stabilized indeed and assumes and maintains the most favorable attitude angle at constant distance from ground.

From a different point of view, one can see that any tendency of the craft to rise results in a pivot motion on the frame tending to reduce the angle of attack and increasing the distance of the craft from ground; both effects cause the lift to be reduced. Any tendency of the craft to drop results in pivot motion tending to increase the angle of attack and reducing the distance; both effects cause the lift to increase. Thus, the craft will maintain a stabilized position.

Stabilization occurs also with regard to any yaw. The pivotal connection of the vehicle plus frame to carriage 3 keeps the vehicle on course. The pivotal anchoring of the craft can be carried out in the front as illustrated or in the rear. But the illustrated disposition is preferred as the craft is held on the carriage like a trailing flag.

The rail track can be of rather simple design and does not require extraordinary strength because it carries a rather small load. It only holds the aircraft and must take the corrective moments as outlined above; it does not support the craft, except, of course, in portions designed for starting and landing.

The illustrated example shows the craft as being self-propelled. However, the carriage 3 may be the driving vehicle, dragging the craft behind. Of course, in such a case vehicle 3 is necessarily heavier and the rail system must support the engine as well as the fuel; the illustrated example does not require such a support.

The invention is not limited to the embodiments described above but all changes and modifications thereof not constituting departures from the spirit and scope of the invention are intended to be included.

I claim:

1. Winged surface effect vehicle improved by means of a guide element for engagement with and connection to a rail track for holding the vehicle laterally in relation to the track while the vehicle is supported by and rides on an air cushion developed on forward thrust between the wings and ground without being supported on the rail, the vehicle being stabilized vertically in its air cushion ride by being held in relation to the guide element.

2. Winged surface effect vehicle as in claim 1, and being pivotally connected to the guide element by a frame as extending from the front of the vehicle, whereby the wing of the vehicle changes its angle of attack upon pivoting by means of said frame thereby stabilizing its vertical disposition and attitude.

3. Winged surface effect vehicle as in claim 2, the frame being adjustable.

4. Winged surface effect vehicle as in claim 1, the guide element constructed as a carriage rolling on the rail track and held thereon against lateral as well as vertical displacement.

5. Winged surface effect vehicle as in claim 4, the front of the vehicle being pivotally held on the carriage capable of pivoting up and down while changing its angle of attack tending to return the vehicle into a stable attitude and distance from ground.

6. Winged surface effect vehicle as in claim 1, wherein the guide element provides forward movement.

* * * * *